(12) United States Patent
Zuchek et al.

(10) Patent No.: US 8,390,420 B2
(45) Date of Patent: Mar. 5, 2013

(54) IMMERSION WELL ASSEMBLY

(75) Inventors: Thomas R. Zuchek, Byrnes Mill, MO (US); Patrick S. Bauman, Ballwin, MO (US)

(73) Assignee: Emerson Electric Co., St. Louis, MO (US)

( * ) Notice: Subject to any disclaimer, the term of this patent is extended or adjusted under 35 U.S.C. 154(b) by 181 days.

(21) Appl. No.: 12/970,374

(22) Filed: Dec. 16, 2010

(65) Prior Publication Data

US 2011/0084794 A1  Apr. 14, 2011

(51) Int. Cl.
*H01C 7/10* (2006.01)

(52) U.S. Cl. .......... 338/22 R; 338/28; 374/208; 374/179

(58) Field of Classification Search .................. None
See application file for complete search history.

(56) References Cited

U.S. PATENT DOCUMENTS

| | | | |
|---|---|---|---|
| 2,161,432 A | 6/1939 | Rees | |
| 2,838,935 A * | 6/1958 | Di Cecio et al. | 338/28 |
| 3,468,723 A | 9/1969 | Lambert | |
| 3,751,305 A | 8/1973 | Huebscher | |
| 4,538,927 A * | 9/1985 | Jochemczyk et al. | 374/163 |
| 4,830,515 A | 5/1989 | Cortes | |
| 5,199,789 A | 4/1993 | Mauric | |
| 5,632,557 A * | 5/1997 | Simons | 374/148 |
| 5,674,009 A * | 10/1997 | Stark | 374/209 |
| 6,599,012 B2 * | 7/2003 | Gul | 374/208 |

OTHER PUBLICATIONS

Johnson Controls, Inc., A99B Series Temperature Sensors, Product/Technical Bulletin A99, 8 pages, 1999.

* cited by examiner

*Primary Examiner* — Kyung Lee

(74) *Attorney, Agent, or Firm* — Harness, Dickey & Pierce, P.L.C.

(57) ABSTRACT

An immersion well assembly may include a thermistor housing defining a first axial passage and a thermistor wire collar axially secured to the thermistor housing and defining a second axial passage. The second axial passage may receive a thermistor wire and may axially fix the thermistor wire relative to the thermistor housing.

17 Claims, 4 Drawing Sheets

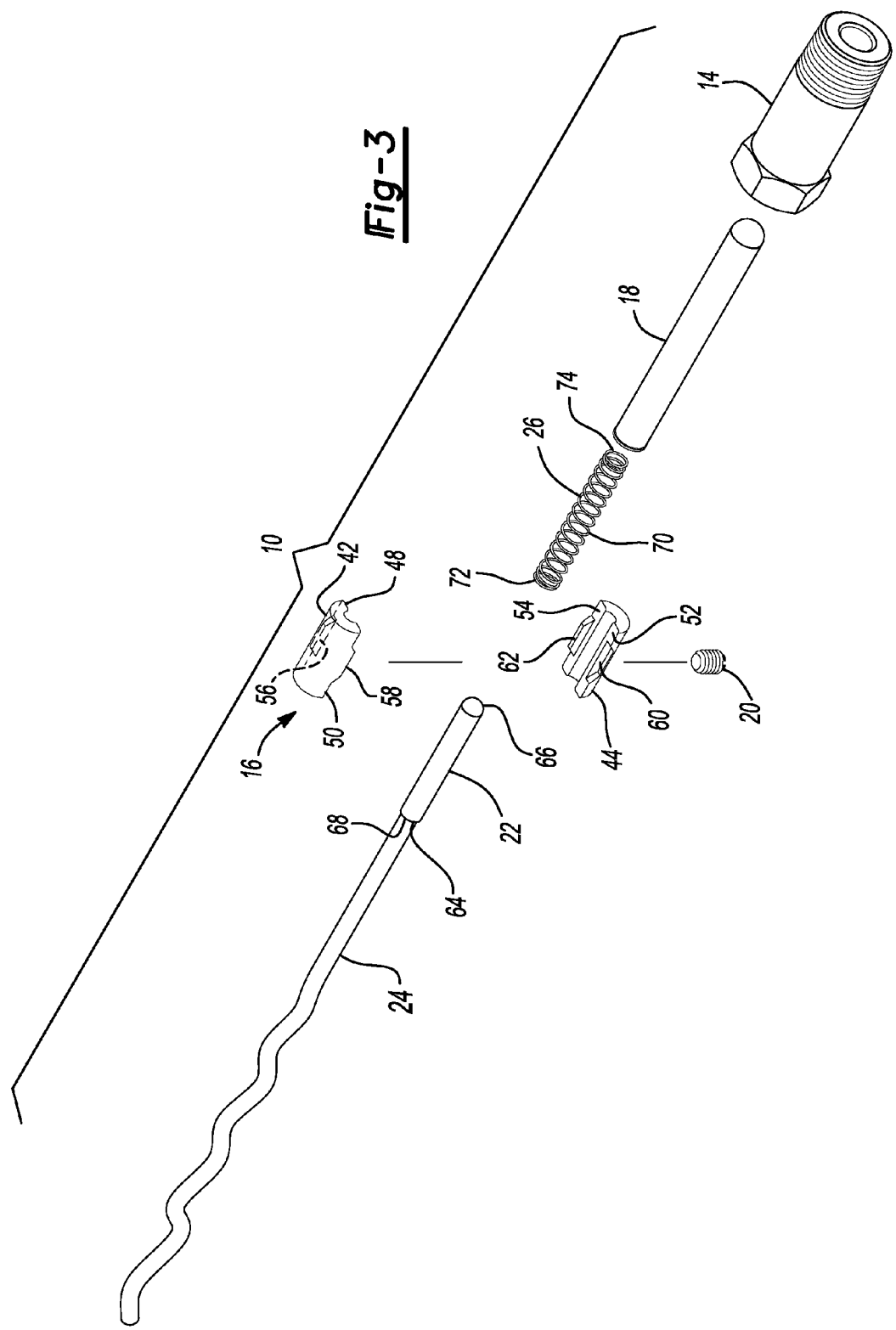

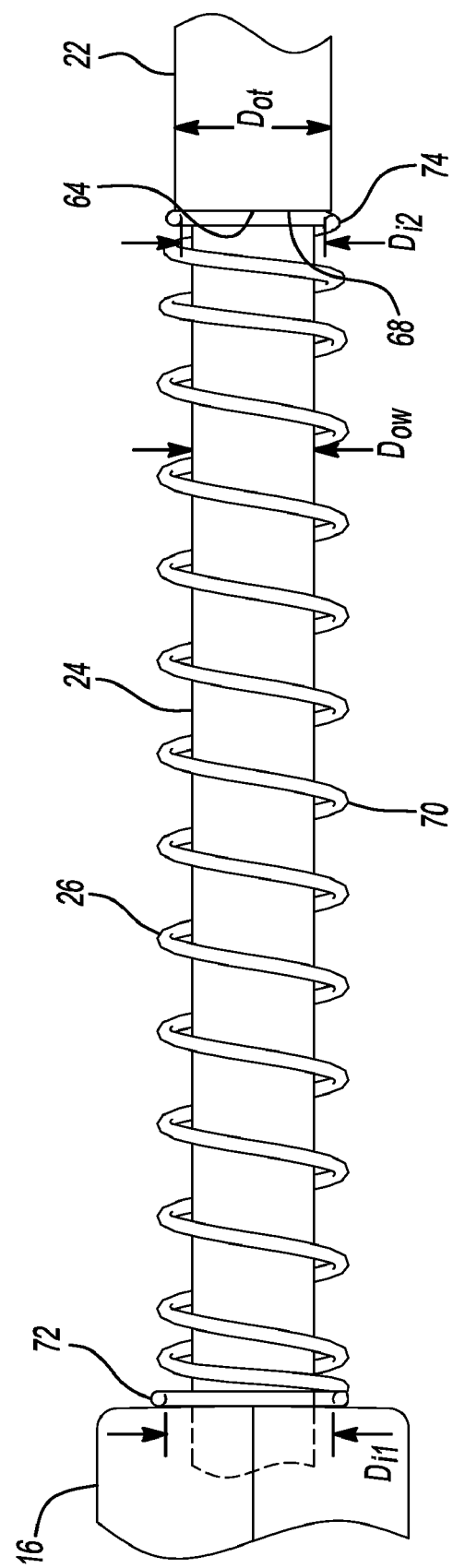

IMMERSION WELL ASSEMBLY

FIELD

The present disclosure relates to immersion well assemblies.

BACKGROUND

This section provides background information related to the present disclosure which is not necessarily prior art.

Immersion well assemblies are typically used in boilers, hot water heaters, supply and return heating, ventilation, and air condition (HVAC) air ducts, refrigeration units, and chilled water lines to measure temperature data. Immersion wells protect electrical and/or mechanical components of a thermistor by providing a physical barrier between the electrical and/or mechanical components of the thermistor and the fluid that is being measured.

SUMMARY

This section provides a general summary of the disclosure, and is not a comprehensive disclosure of its full scope or all of its features.

An immersion well assembly may include a thermistor housing defining a first axial passage and a thermistor wire collar axially secured to the thermistor housing and defining a second axial passage. The second axial passage may receive a thermistor wire and may axially fix the thermistor wire relative to the thermistor housing.

A thermistor wire collar may include first and second members displaceable relative to one another. The first member may define a first circumferential end and the second member may define a second circumferential end displaceable relative to the first circumferential end to provide an opening to locate the thermistor wire within the second axial passage. The first circumferential end may define a recess and the second circumferential end may define a protrusion located within the recess and fixing the first and second members to one another.

The immersion well assembly may additionally include the thermistor wire and a thermistor fixed to an end of the thermistor wire. The thermistor wire collar may be located within the first axial passage. The immersion well assembly may additionally include a fastener securing the thermistor wire collar within the first axial passage. The immersion well assembly may further include a spring extending between the thermistor wire collar and a first axial end of the thermistor and biasing the thermistor axially outward from the thermistor wire collar. The spring may be axially displaceable past a second axial end of the thermistor during assembly.

In another arrangement, an immersion well assembly may include a thermistor housing, a thermistor wire collar and a spring. The thermistor housing may define a first axial passage that receives a thermistor. The thermistor wire collar may be axially secured to the thermistor housing. The spring may extend between the thermistor wire collar and a first axial end of the thermistor and may bias the thermistor axially outward from the thermistor wire collar. The spring may be axially displaceable past a second axial end of the thermistor opposite the first axial end during assembly.

The spring may include a coiled body having a first axial end defining a first inner diameter and a second axial end defining a second inner diameter less than the first inner diameter. The first axial end of the spring may be engaged with the thermistor wire collar and the second axial end of the spring may be engaged with the first axial end of the thermistor. The first inner diameter may be greater than an outer diameter of the thermistor and a second inner diameter may be less than the outer diameter of the thermistor.

The spring may define a coiled body decreasing in diameter from a first axial end to a second axial end. The immersion well assembly may additionally include the thermistor and a thermistor wire extending from the first axial end of the thermistor.

A method of assembling an immersion well assembly may include locating a thermistor wire collar on a thermistor wire at a location proximate a first axial end of the thermistor wire engaged with a first axial end of the thermistor. A second end of the thermistor may be inserted into a spring. The spring may be displaced axially along the thermistor past the first axial end of the thermistor and the thermistor may be secured within a thermistor housing.

Securing the thermistor within the thermistor housing may include axially securing the thermistor wire collar relative to the thermistor housing. Locating the thermistor wire collar on the thermistor wire may include axially fixing the thermistor wire relative to the thermistor wire collar. Securing the thermistor wire collar may include applying a radial force against the thermistor wire collar.

Locating the thermistor wire collar on the thermistor wire may include displacing first and second members of the thermistor wire collar located on opposite sides of the thermistor wire radially toward one another and fixing the first and second members to one another. The spring may include a first axial end engaged with the thermistor wire collar and a second axial end engaged with the first axial end of the thermistor. Locating the thermistor wire collar on the thermistor wire may occur after the thermistor wire and thermistor are coupled together. Inserting the thermistor into the spring may occur after the locating and displacing the spring axially along the thermistor may occur after the thermistor is inserted into the spring. The thermistor may be secured within the thermistor housing after the spring is displaced axially along the thermistor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is an exploded perspective view of the immersion well assembly shown in FIG. 1; and FIG. 4 is a side view of a portion of the immersion well assembly shown in FIG. 1.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
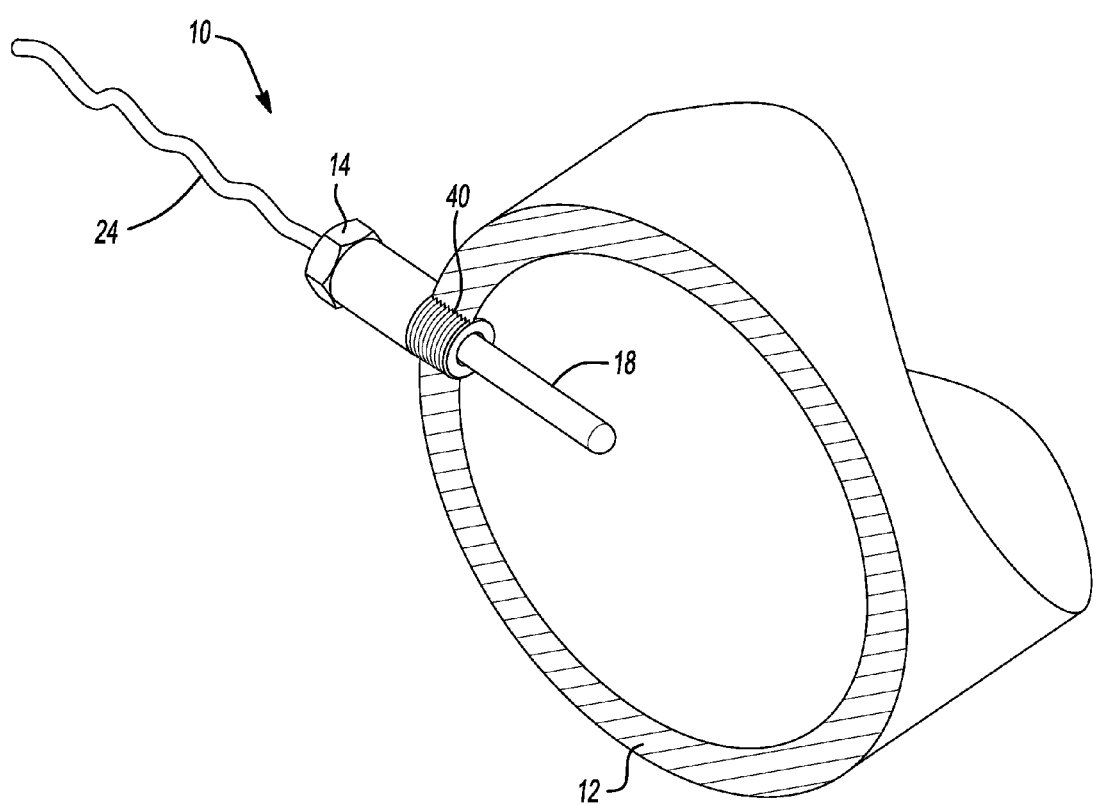
FIG. 1 is a perspective view of an immersion well assembly according to the present disclosure incorporated into a boiler intake pipe.

With reference to FIG. 1, an immersion well assembly 10 is illustrated in a boiler intake pipe 12. The incorporation of the immersion well assembly 10 in a boiler intake pipe 12 is for purposes of illustration only. It is understood that the immersion well assembly 10 may be used in a variety of additional settings including, but not limited to, hot water heaters, supply and return heating, ventilation, and air condition air ducts, refrigeration units, and/or chilled water lines. Immersion wells may protect the electrical and/or mechanical components by providing a physical barrier between the electrical and/or mechanical components and the fluid being measured. In the present example, an additional immersion well assembly 10 may be installed in a boiler output pipe (not shown). The temperature differential between water in the boiler intake pipe 12 and the output pipe may be used to assess the operability of the boiler.

Figure 2:
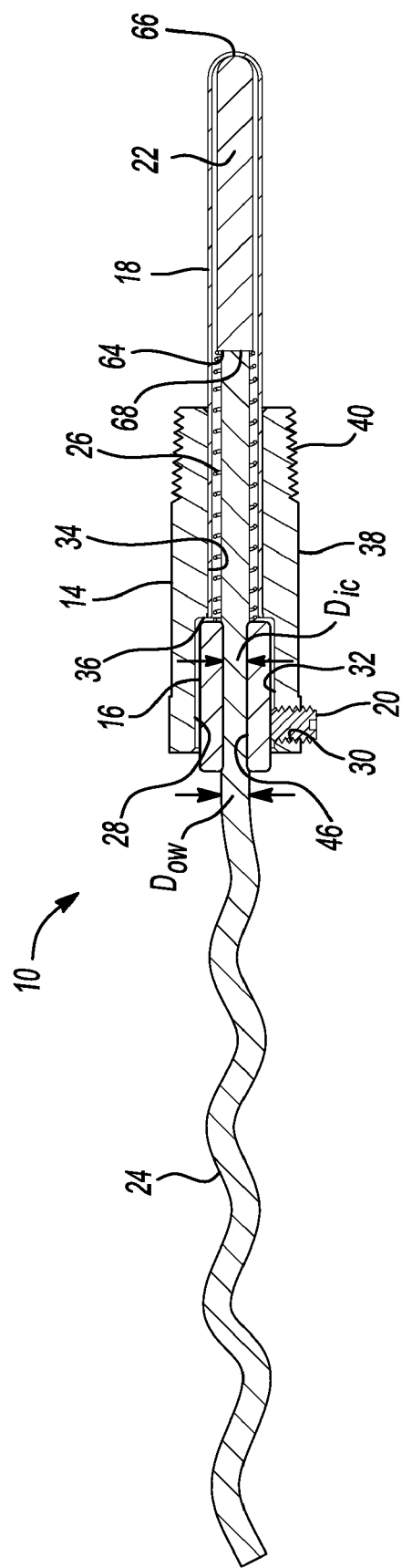
FIG. 2 is a section view of the immersion well assembly of FIG. 1.

As seen in FIGS. 2-4, the immersion well assembly 10 may include a thermistor housing 14, a thermistor wire collar 16, a thermistor sleeve 18, a fastener 20, a thermistor 22, a thermistor wire 24 and a spring 26. The thermistor housing 14 may define a first axial passage 28 and a threaded aperture 30. The first axial passage 28 may define first and second portions 32, 34 separated by a stepped region 36. The threaded aperture 30 may extend radially through an outer surface 38 of the thermistor housing 14 and into the first portion 32 of the first axial passage 28. The outer surface 38 may additionally include a threaded region 40 that secures the immersion well assembly to a mounting structure, such as the boiler intake pipe 12. The thermistor sleeve 18 may be fixed to an end of the thermistor housing 14.

The thermistor wire collar 16 may be axially secured to the thermistor housing 14. More specifically, the thermistor wire collar 16 may be located in the first portion 32 of the first axial passage 28 and secured to the thermistor housing by the fastener 20. In the present non-limiting example, the fastener 20 may be in the form of a set screw threaded into the threaded aperture 30 and engaging the thermistor wire collar 16. The fastener 20 may apply an inward radial force to the thermistor wire collar 16 to axially secure the thermistor wire collar 16 within the thermistor housing 14.

The thermistor wire collar 16 may include first and second members 42, 44 displaceable relative to one another and defining a second axial passage 46. The second axial passage 46 may define an inner diameter ($D_{ic}$). The first member 42 may define first and second circumferential ends 48, 50 and the second member 44 may define first and second circumferential ends 52, 54.

The first circumferential end 48 may define a recess 56 and the second circumferential end 50 may define a protrusion 58. Similarly, the first circumferential end 52 may define a recess 60 and the second circumferential end 54 may define a protrusion 62. The protrusion 58 may be located within the recess 60 and the protrusion 62 may be located within the recess 56. The engagement between the protrusions 58, 62 and the recesses 56, 60 may fix the first and second members 42, 44 to one another. More specifically, the engagement between the protrusions 58, 62 and the recesses 56, 60 may fix the first and second members 42, 44 axially relative to one another.

The thermistor 22 may be located in the thermistor sleeve 18 and may include first and second axial ends 64, 66. The thermistor 22 may be fixed to an end of the thermistor wire 24. More specifically, the thermistor wire 24 may extend from the first axial end 64 of the thermistor 22. The first axial end 64 of the thermistor 22 may define an outer diameter ($D_{ot}$) and the thermistor wire 24 may define an outer diameter ($D_{ow}$), forming a stepped region 68 at the interface between the thermistor 22 and the thermistor wire 24. While the stepped region 68 is illustrated as being formed at the interface between the thermistor 22 and the thermistor wire 24, it is understood that alternate arrangements may exist where a stepped region is formed on the thermistor 22.

The thermistor wire 24 may be located within the second axial passage 46. The thermistor wire collar 16 may fix the thermistor wire 24 axially relative to the thermistor housing 14. In the present example, the outer diameter ($D_{ow}$) defined by the thermistor wire 24 may be greater than the inner diameter ($D_{ic}$) defined by the thermistor wire collar 16 in an unassembled condition. The first and second members 42, 44 may clamp the thermistor wire 24 when assembled to axially fix the thermistor wire 24 relative to the thermistor wire collar 16.

The spring 26 may extend between the thermistor wire collar 16 and the first axial end 64 of the thermistor 22. The spring 26 may bias the thermistor 22 axially outward from the thermistor wire collar 16 and against an end of the thermistor sleeve 18. The spring 26 may include a coiled body 70 having first and second axial ends 72, 74 and decreasing in diameter from the first axial end 72 to the second axial end 74. The first axial end 72 may be engaged with the thermistor wire collar 16 and the second axial end 74 may be engaged with the first axial end 64 of the thermistor 22 at the stepped region 68.

The first axial end 72 may define a first inner diameter ($D_{i1}$) and the second axial end 74 may define a second inner diameter ($D_{i2}$) less than the first inner diameter ($D_{i1}$). The first inner diameter ($D_{i1}$) may be greater than the outer diameter ($D_{ot}$) of the thermistor 22. The second inner diameter ($D_{i2}$) may be less than the outer diameter ($D_{ot}$) of the thermistor 22.

During assembly, the thermistor wire collar 16 may be located on the thermistor wire 24 at a location proximate an end of the thermistor wire 24 fixed to the thermistor 22. The thermistor wire collar 16 may be located on the thermistor wire 24 after the thermistor 22 is fixed (connected to) the thermistor wire 24. More specifically, the first and second members 42, 44 may be located on opposite radial sides of the thermistor wire 24, displaced radially inward toward one another and fixed to one another clamping the thermistor wire 24 therebetween. The thermistor wire 24 may be axially fixed relative to the thermistor wire collar 16 by the clamping.

The second axial end 66 of the thermistor 22 may then be inserted into the first axial end 72 of the spring 26. The spring 26 may then be displaced axially along the thermistor 22 past the first axial end 64 of the thermistor 22. Since the second inner diameter ($D_{i2}$) at the second axial end 74 of the spring 26 is less than the outer diameter ($D_{ot}$) of the thermistor 22, the second axial end 74 may flex radially outward while being displaced past the first axial end 64 of the thermistor 22. Once the second axial end 74 of the spring 26 is past the first axial end 64 of the thermistor 22, the second axial end 74 may return to second inner diameter ($D_{i2}$) and abut the stepped region 68, securing the spring 26 axially between the thermistor wire collar 16 and the thermistor 22.

The thermistor 22 may then be secured within the thermistor housing 14. The thermistor wire collar 16, the thermistor 22, and the spring 26 may be located within the first axial passage 28. More specifically, the thermistor wire collar 16 may be located in the first portion 32 of the first axial passage 28 and may abut the stepped region 36. A portion of the thermistor wire 24 and the spring 26 may extend through the second portion 34 of the first axial passage 28 and the thermistor 22 may be located within the thermistor sleeve 18. The fastener 20 may then be located in the threaded aperture 30 and rotated to apply an inward radial force on the thermistor wire collar 16, securing the thermistor wire collar 16 axially relative to the thermistor housing 14.

The location of the thermistor wire collar 16 along the thermistor wire 24 may provide stress reduction at the junction between the thermistor 22 and the thermistor wire 24. More specifically, the length defined by the thermistor 22 and the extent of the thermistor wire 24 beyond the end of the thermistor wire collar 16 may be greater than the distance defined between the end of thermistor wire collar 16 and the end of the thermistor sleeve 18.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An immersion well assembly comprising:
a thermistor housing defining a first axial passage;
a thermistor wire collar axially secured to said thermistor housing and defining a second axial passage that receives a thermistor wire and axially fixes the thermistor wire relative to said thermistor housing;
a thermistor attached to said thermistor wire; and
a spring extending between said thermistor wire collar and said thermistor and including a first end in contact with said thermistor wire collar and a second end in contact with said thermistor, said first end including a first diameter and said second end including a second diameter smaller than said first diameter.

2. The immersion well assembly of claim 1, wherein said thermistor wire collar includes first and second members displaceable relative to one another.

3. The immersion well assembly of claim 2, wherein said first member defines a first circumferential end and said second member defines a second circumferential end displaceable relative to said first circumferential end to provide an opening to locate the thermistor wire within said second axial passage.

4. The immersion well assembly of claim 3, wherein said first circumferential end defines a recess and said second circumferential end defines a protrusion located within said recess and fixing said first and second members to one another.

5. The immersion well assembly of claim 1, wherein said spring includes a conical shape having a decreasing diameter from said first end to said second end.

6. The immersion well assembly of claim 1, wherein said thermistor wire collar is located within said first axial passage.

7. The immersion well assembly of claim 5, further comprising a fastener securing said thermistor wire collar within said first axial passage.

8. The immersion well assembly of claim 1, wherein said spring biases said the thermistor in a direction away from said thermistor wire collar.

9. An immersion well assembly comprising:
a thermistor housing defining a first axial passage;
a thermistor wire collar axially secured to said thermistor housing to fix a thermistor wire relative to said thermistor housing;
a thermistor attached to said thermistor wire; and
a spring extending between said thermistor wire collar and said thermistor and including a decreasing inner diameter in a direction extending from said thermistor wire collar to said thermistor.

10. The immersion well assembly of claim 9, wherein said spring includes a first end in contact with said thermistor wire collar and a second end in contact with said thermistor.

11. The immersion well assembly of claim 10, wherein said first end includes a diameter that is greater than an outer diameter of said thermistor and said second end includes a diameter that is smaller than said outer diameter of said thermistor.

12. A method comprising:
attaching a thermistor wire collar to a thermistor wire;
attaching a first end of a thermistor to said thermistor wire;
inserting a first end of a spring over a second end of said thermistor that is formed at an opposite end of said thermistor than said first end;
moving said spring along said thermistor to allow a second end of said spring to engage an outer diameter of said thermistor;
expanding a diameter of said spring at said second end when said spring is moved along said outer diameter of said thermistor;
disengaging said second end of said spring from said outer diameter of said thermistor to allow said second end of said spring to return to a relaxed state;
positioning said spring between said thermistor wire collar and said thermistor; and placing said second end of said spring in contact with said thermistor.

13. The method of claim 12, wherein placing said second end of said spring in contact with said thermistor biases said thermistor in a direction away from said thermistor collar.

14. The method of claim 13, wherein attaching said thermistor wire collar includes applying a radial force against said thermistor wire collar.

15. The method of claim 12, wherein attaching said thermistor wire collar on said thermistor wire includes displacing first and second members of said thermistor wire collar located on opposite sides of said thermistor wire radially toward one another and fixing said first and second members to one another.

16. The method of claim 12, further comprising engaging said first end of said spring with said thermistor wire collar.

17. The method of claim 12, wherein said inserting said first end of said spring over said second end of said thermistor is performed after said thermistor and said thermistor wire collar are attached to said thermistor wire.

* * * * *